(12) United States Patent
Taji et al.

(10) Patent No.: US 6,348,750 B1
(45) Date of Patent: Feb. 19, 2002

(54) ALTERNATOR

(75) Inventors: Ryoichi Taji; Atsushi Oohashi, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/599,520

(22) Filed: Jun. 23, 2000

(30) Foreign Application Priority Data

Jan. 27, 2000 (JP) ........................................ 2000-018610

(51) Int. Cl.$^7$ ............................ H02K 3/00; H02K 3/04; H02K 3/12
(52) U.S. Cl. ...................... 310/184; 310/179; 310/180; 310/207

(58) Field of Search ................................ 310/179, 180, 310/181, 184, 201, 198, 207

(56) References Cited

U.S. PATENT DOCUMENTS

| 4,163,915 A | * | 8/1979 | Fong .......................... 310/138 |
| 5,274,322 A | * | 12/1993 | Hayashi et al. ................ 322/90 |
| 5,898,251 A | * | 4/1999 | Mochizuki et al. .......... 310/179 |
| 6,201,332 B1 | * | 3/2001 | Umeda et al. ............... 310/184 |

FOREIGN PATENT DOCUMENTS

| JP | 11-164504 | 6/1999 | ............ H02K/3/24 |

* cited by examiner

*Primary Examiner*—Burton S Mullins
(74) *Attorney, Agent, or Firm*—Sughrue Mion, PLLC (57) ABSTRACT

Winding sub-portions in an alternator are directly and continuously connected to each other within slots.

6 Claims, 8 Drawing Sheets

ALTERNATOR

BACKGROUND OF THE INVENTION

1. Field of the Invention

The present invention relates to an alternator driven by an internal combustion engine, for example.

2. Description of the Related Art

Figure 4:
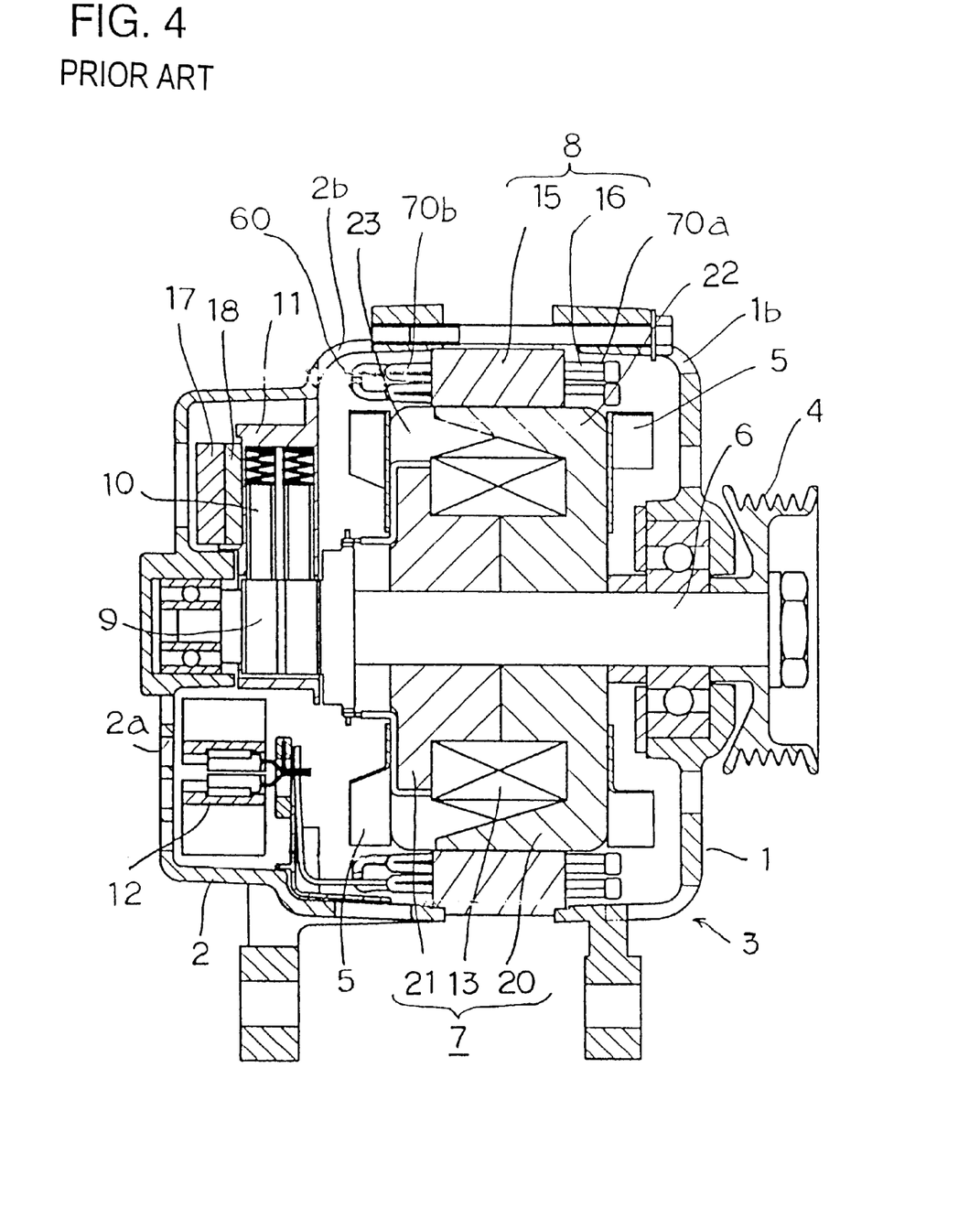
FIG. 4 is a cross section of a conventional automotive alternator.

FIG. 4 is a cross-section of a conventional automotive alternator. This alternator includes: a case 3 composed of an aluminum front bracket 1 and an aluminum rear bracket 2; a shaft 6 disposed within the case 3 having a pulley 4 secured to a first end thereof; a Lundell-type rotor 7 secured to the shaft 6; fans 5 secured to both end surfaces of the rotor 6; a stator 8 secured to an inner wall of the case 3; slip rings 9 secured to a second end of the shaft 6 for supplying electric current to the rotor 7; a pair of brushes 10 sliding on the slip rings 9; brush holders 11 accommodating the brushes 10; a rectifier 12 in electrical contact with the stator 8 for converting alternating current generated in the stator 8 into direct current; a heat sink 17 fitted over the brush holder 11; and a regulator 18 fastened to the heat sink 17 by adhesive for adjusting the magnitude of the alternating voltage generated in the stator 8.

The rotor 7 is composed of a rotor coil 13 for generating magnetic flux on passage of electric current, and a pair of first and second pole cores 20 and 21 disposed so as to cover the rotor coil 13, magnetic poles being produced in the pair of pole cores 20 and 21 by the magnetic flux. The pair of pole cores 20 and 21 are made of iron and each has eight claw-shaped magnetic poles 22 and 23 secured to the shaft so as to be spaced at even pitch circumferentially around a circumferential edge, facing each other so as to intermesh.

The stator 8 includes a stator core 15 composed of a cylindrical laminated iron core in which a number of slots extending longitudinally are formed at a predetermined pitch in a circumferential direction, and a three-phase stator winding 16 wound into the stator core 15.

Air intake vents 1a and 2a are formed in central portions of the front bracket 1 and the rear bracket 2, respectively, and air discharge vents 1b and 2b are formed in outer circumferential shoulder portions of the front bracket 1 and the rear bracket 2, respectively.

Next, the wiring construction of the a-phase stator winding portion 16a of the three-phase stator winding 16 will be explained with reference to the winding diagram in FIG. 5. Moreover, this diagram shows the wiring construction when the stator 8 is viewed from the rear bracket 2 end, and in the figure solid lines indicate wire at the rear bracket 2 end, and dotted lines indicate wire at the front bracket 1 end. Moreover, black dots in the circular symbols inside the slots 15a of the stator core 15 indicate wires extending from the front bracket 1 end to the rear bracket 2 end, and "X" symbols in the circular symbols inside the slots 15a of the stator core 15 indicate wires extending from the rear bracket 2 end to the front bracket 1 end.

The a-phase stator winding portion 16a includes first to fourth winding sub-portions 31 to 34. The first winding sub-portion 31, which has a first end connected to an a-phase lead wire 100, leads from the rear bracket 2 end at the second position from an inner circumferential side (hereinafter the positions counted in order from the inner circumferential side will be called the first, second, third, and fourth positions, respectively) inside a slot 15a whose slot number is number 1. Thereafter, the first winding sub-portion 31 is constructed by wave winding such that the winding alternates between the first position and the second position within the slots every third slot in a counterclockwise direction, and a second end of the first winding sub-portion 31 arrives at the first position in slot number 34. This first winding sub-portion 31 is connected to a first end of the third winding sub-portion 33 through a first bridging portion 60.

At the fourth position in slot number 1, the third winding sub-portion 33, which has a first end connected to the first bridging portion 60 from the rear bracket 2 end, is constructed by wave winding such that the winding alternates between the third position and the fourth position within the slots every third slot in a counterclockwise direction until slot number 34, and a second end thereof arrives at the third position in slot number 34. This third winding sub-portion 33 is connected to the second winding sub-portion 32 through a second bridging portion 61.

At the first position in slot number 1, the second winding sub-portion 32, which has a first end connected to the second bridging portion 61 from the rear bracket 2 end, is constructed by wave winding such that the winding alternates between the first position and the second position within the slots every third slot in a clockwise direction until slot number 4, and a second end thereof arrives at the second position in slot number 4. This second winding sub-portion 32 is connected to the fourth winding sub-portion 34 through a third bridging portion 62.

At the third position in slot number 1, the fourth winding sub-portion 34, which has a first end connected to the third bridging portion 62 from the rear bracket 2 end, is constructed by wave winding such that the winding alternates between the third position and the fourth position within the slots every third slot in a clockwise direction until slot number 4, and a second end thereof arrives at the fourth position in slot number 4. This fourth winding sub-portion 34 is connected to a neutral point lead wire 101.

In this manner, in the a-phase stator winding portion 16a, the first winding sub-portion 31, which is connected to the a-phase lead wire 100, makes one lap in a counterclockwise direction in every third slot while alternating between the second position and the first position and then the third winding sub-portion 33 makes one lap in a counterclockwise direction in every third slot while alternating between the fourth position and the third position. In addition, the second winding sub-portion 32 makes one lap in a clockwise direction in every third slot while alternating between the second position and the first position and then the fourth winding sub-portion 34 makes one lap in a clockwise direction in every third slot while alternating between the fourth position and the third position. Each of the winding sub-portions 31 to 34 is connected in series by means of the bridging portions 60 to 62, constituting a four-turn a-phase stator winding portion 16a.

Similarly, a b-phase stator winding portion and a c-phase stator winding portion are formed by offsetting by one slot 15a and, together with the a-phase stator winding portion, constitute the star-connected three-phase stator winding 16.

Figure 6:
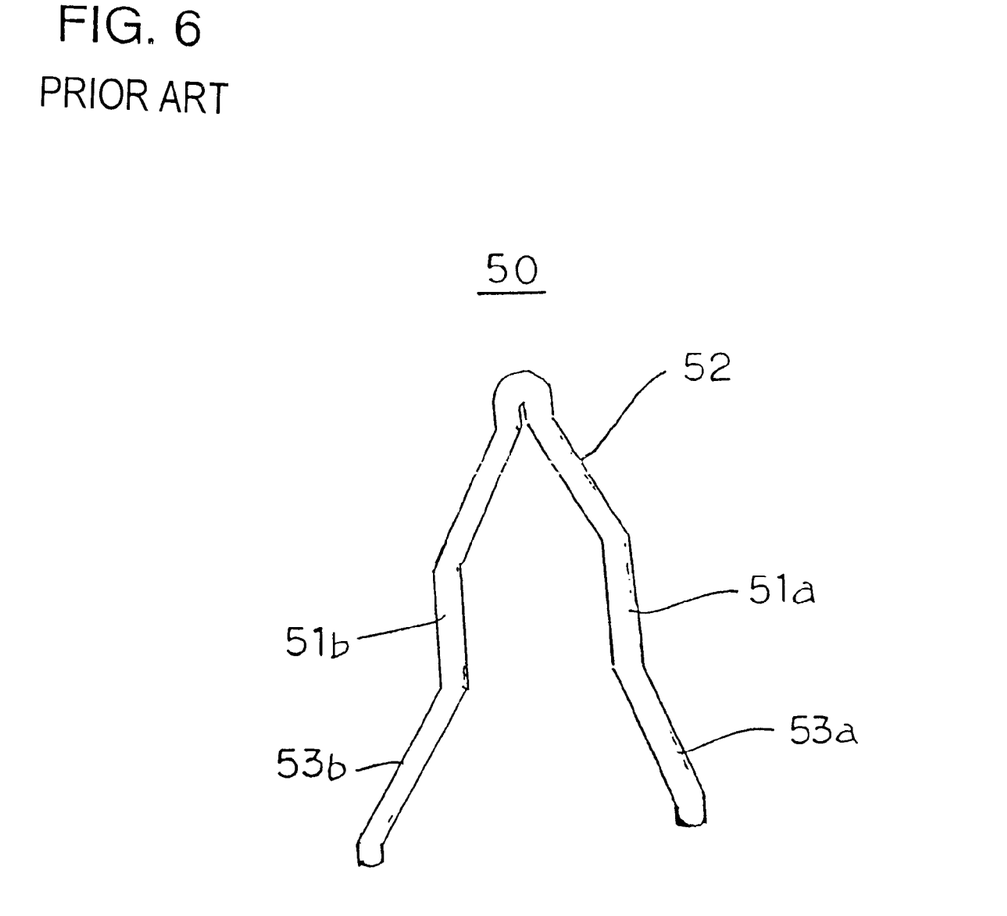
FIG. 6 is a perspective of a conductor segment used in the stator winding in FIG. 4.

The three-phase stator winding 16 of the above construction is formed by joining a number of short conductor segments 50 such as the one shown in FIG. 6.

The conductor segments 50, which are component elements of the conductors, are each formed into a U shape from copper wire material having a rectangular cross section coated with insulation, and each includes a pair of first and second straight portions 51a and 51b housed inside the slots 15a, a base end portion 52 connecting the straight portions 51a and 51b to each other, and joining portions 53a and 53b disposed on end portions of the straight portions 51a and 51b for joining adjacent conductor segments 50 to each other.

Next, the steps in forming the a-phase stator winding portion 16a using the conductor segments 50 will be explained.

Figure 7:
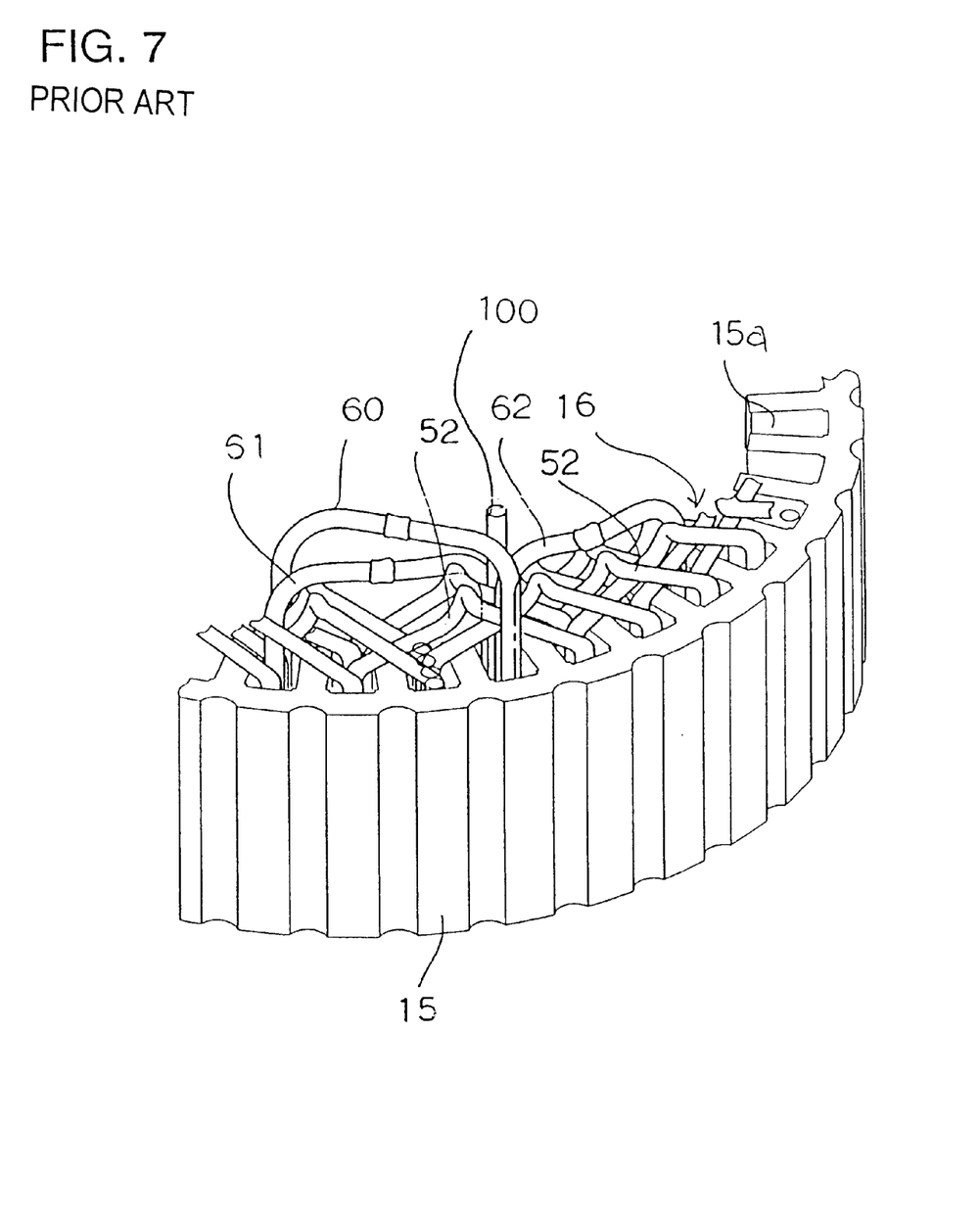
FIG. 7 is a partial perspective of the stator in FIG. 4 viewed from a rear bracket end.

First, as shown in FIG. 7, four straight portions 51a and 51b of conductor segments 50 are arranged to line up in a row in a radial direction within each of the slots 15a by inserting conductor segments 50 from the rear bracket 2 end into a predetermined slot number such that the first straight portion 51a of a first conductor segment 50 is in the first position and the second straight portion 51b of the first conductor segment 50 is in the second position three slots away, and the first straight portion 51a of a second conductor segment 50 is in the third position and the second straight portion 51b of the second conductor segment 50 is in the fourth position three slots away.

Figure 5:
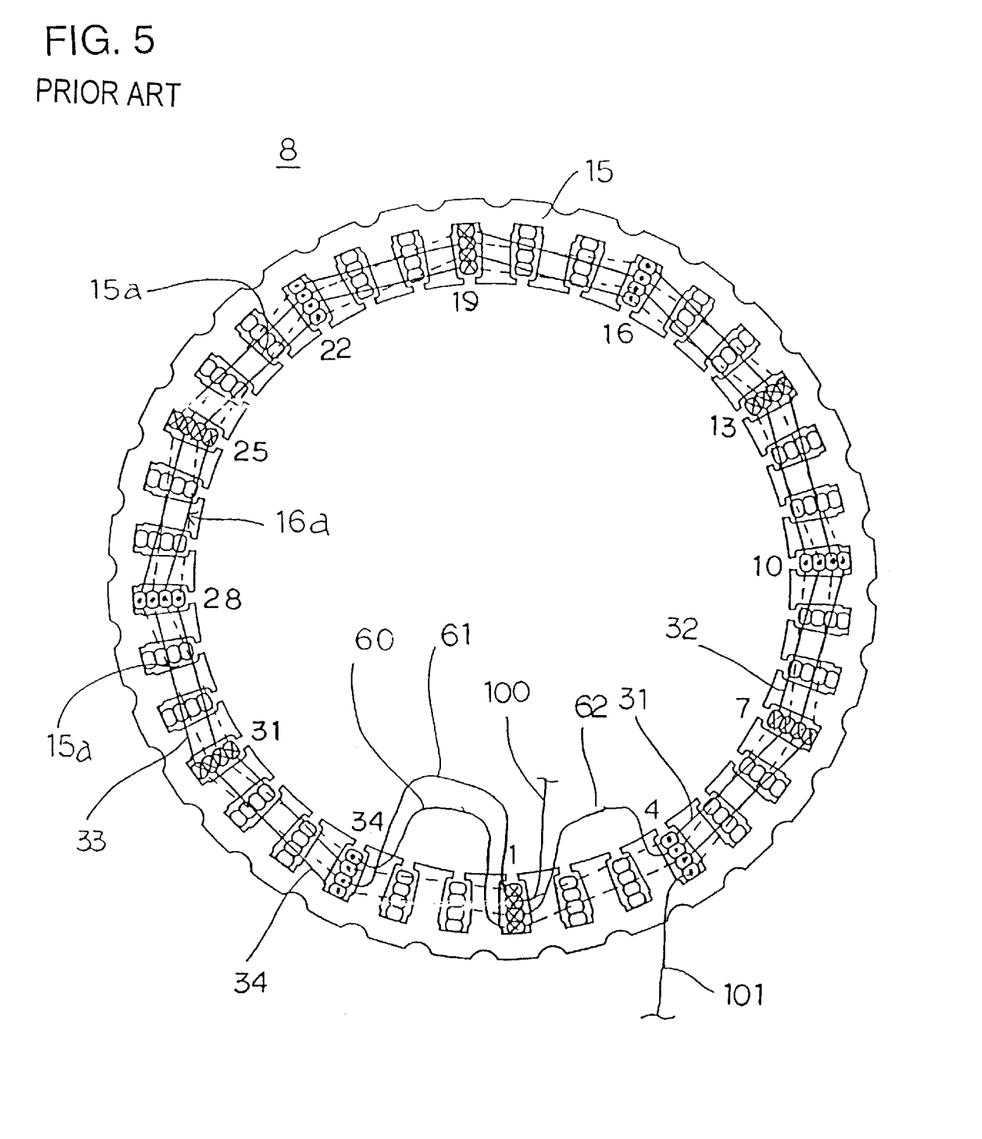
FIG. 5 is a wiring diagram for the stator in FIG. 4.
Figure 8:
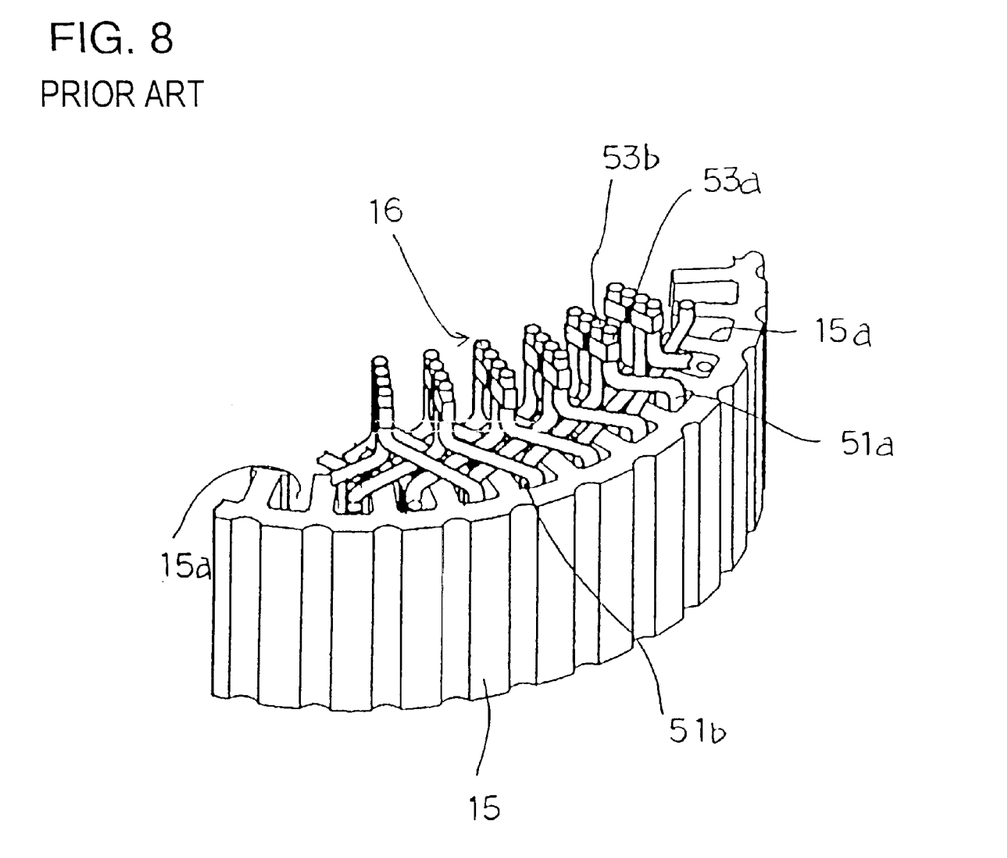
FIG. 8 is a partial perspective of the stator in FIG. 4 viewed from a front bracket end.

Then, as shown in FIG. 8, at the front bracket 1 end, the joining portions 53a leading out from the straight portions 51a in the first position and the joining portions 53b leading out from the straight portions 51b in the second position three slots away are joined, and the joining portions 53a leading out from the straight portions 51a in the third position and the joining portions 53b leading out from the straight portions 51b in the fourth position three slots away are joined in accordance with the wiring diagram in FIG. 5, forming the four-turn a-phase stator winding portion 16a.

The four-turn b-phase stator winding portion and the four-turn c-phase stator winding portion are formed similarly and, together with the a-phase stator winding portion, constitute the star-connected three-phase stator winding 16.

Moreover, some of the base end portions 52 in FIG. 7 protrude more at the rear bracket 2 end than other base end portions 52, and the sites of these protrusions correspond to the first bridging portion 60 connecting the second end of the first winding sub-portion 31 to the first end of the third winding sub-portion 33, the second bridging portion 61 connecting the second end of the third winding sub-portion 33 to the first end of the second winding sub-portion 32, and the third bridging portion 62 connecting the second end of the second winding sub-portion 31 to the first end of the fourth winding sub-portion 33.

In an automotive alternator constructed in this manner, current is supplied from a battery (not shown) by means of the brushes 10 and the slip rings 9 to the rotor coil 13, and magnetic flux is generated. The claw-shaped magnetic poles 22 of the first pole core 20 are polarized with north-seeking (N) poles by the magnetic flux, and the claw-shaped magnetic poles 23 of the second pole core 21 are polarized with south-seeking (S) poles. At the same time, the rotational torque of the engine is transmitted to the shaft 6 by means of a belt and the pulley 4, and the rotor 7 is rotated. Thus, a rotating magnetic field is imparted to the three-phase stator winding 16 and electromotive force is generated in the three-phase stator winding 16. This alternating electromotive force is converted into direct current by means of the rectifier 12, its magnitude is regulated by the regulator 18, and the battery is recharged.

In the rear bracket 2 end, external air is drawn in by rotation of the fans 5 through the air intake vents 2a disposed opposite the heat sink of the rectifier 12 and the heat sink 17 of the regulator 18, respectively, and flows along the axis of the shaft 6, cooling the rectifier 12 and the regulator 18, and is then deflected centrifugally by the fans 5, cooling the coil ends 70b of the three-phase stator winding 16 at the rear bracket 2 end before being expelled through the air discharge vents 2b to the outside.

At the same time, in the front bracket 1 end, external air is drawn in axially by rotation of the fans 5 through the air intake vents 1a and is then deflected centrifugally by the fans 5, cooling the coil ends 70a of the three-phase stator winding 16 at the front bracket 1 end before being expelled through the air discharge vents 1b to the outside.

In the automotive alternator of the above construction, because the first bridging portion 60 connecting the second end of the first winding sub-portion 31 to the first end of the third winding sub-portion 33, the second bridging portion 61 connecting the second end of the third winding sub-portion 33 to the first end of the second winding sub-portion 32, and the third bridging portion 62 connecting the second end of the second winding sub-portion 31 to the first end of the fourth winding sub-portion 33 are at the rear bracket 2 end and these bridging portions 60, 61, and 62 protrude towards the rear bracket 2, the following problems occur:

a. There is a risk that the bridging portions 60, 61, and 62 will contact each other and short;

b. The bridging portions 60, 61, and 62 protrude in an axial direction, making the axial dimensions proportionately larger;

c. Conductor segments 50 having different dimensions from other conductor segments 50 must be prepared for use in the bridging portions 60, 61, and 62, making the operation of inserting the conductor segments 50 into the slots 15a difficult;

d. Noise arises due to interference between the ventilation and the bridging portions 60, 61, and 62; and e. The amount of copper used increases proportionately with the use of bridging portions 60, 61, and 62, increasing copper loss.

SUMMARY OF THE INVENTION

The present invention aims to solve the above problems and an object of the present invention is to provide an alternator removing disadvantages such as shorting due to contact between bridging portion by enabling elimination of the three bridging portions.

To this end, according to the present invention, there is provided an alternator comprising: a case; a rotor disposed inside the case, north-seeking and south-seeking poles being formed alternately around a rotational circumference of the rotor; and a stator having a stator core surrounding the rotor, and a polyphase stator winding installed in the stator core, a number of slots extending in an axial direction being formed in the stator core at a predetermined pitch in a circumferential direction, each phase of stator winding portion in the polyphase stator winding being formed in a number of turns by electrically connecting in series a number of winding sub-portions each constructed substantially in one lap such that wire forms coil ends which bend back outside the slots at end surfaces of the stator core, and alternates between inner layers and outer layers in a slot depth direction within the slots at intervals of a predetermined number of the slots, (n−1) turns of the wire being housed in a slot housing a first end portion of the stator winding portion connected to a lead wire and a slot housing a second end portion of the stator winding portion connected to a neutral point lead wire, and n turns of wire being housed in other slots, the winding sub-portions being directly and continuously connected to each other within the slots.

DETAILED DESCRIPTION OF THE PREFERRED EMBODIMENT

Embodiment 1

Figure 1:
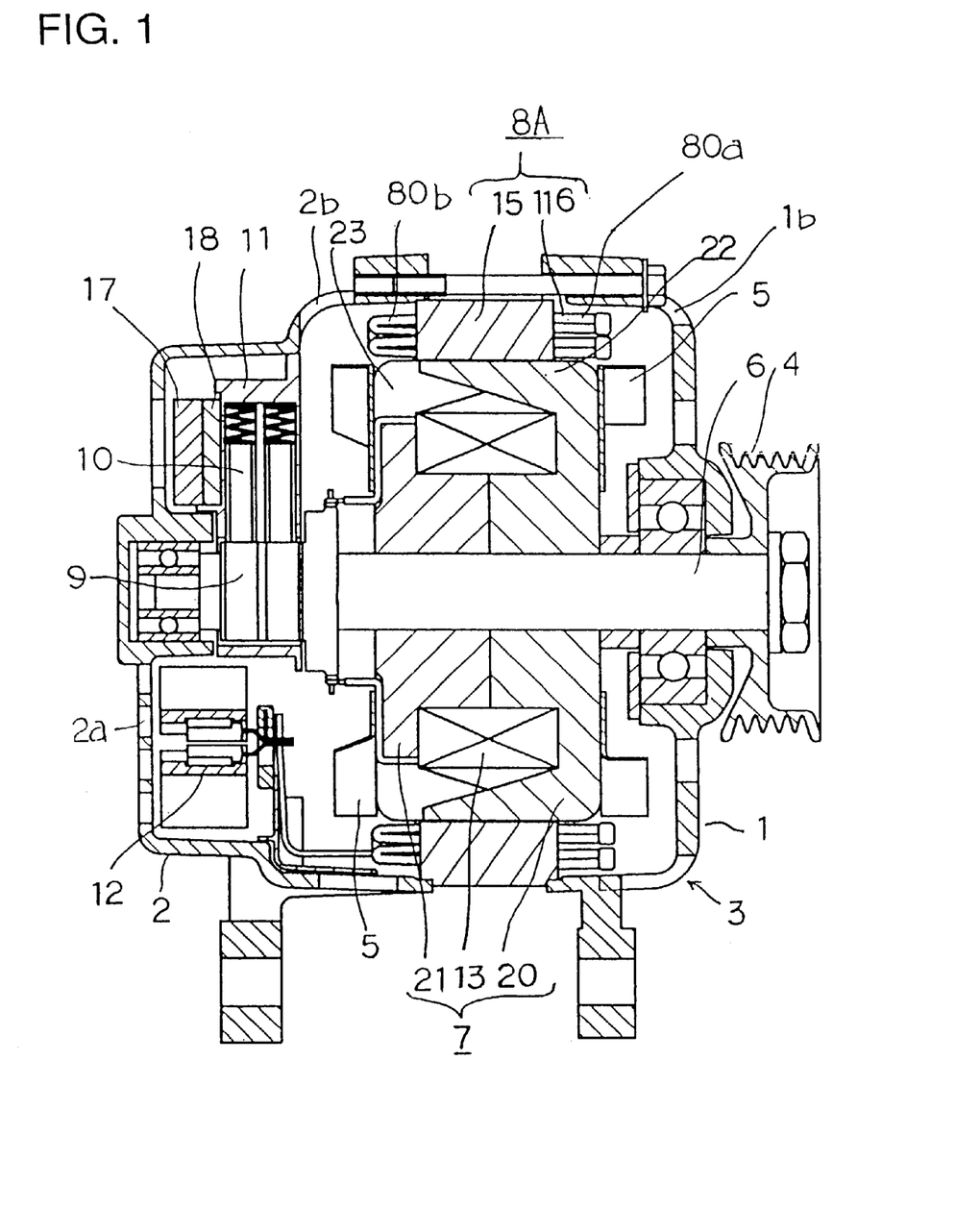
FIG. 1 is a cross section of an automotive alternator according to Embodiment 1 of the present invention.

FIG. 1 is a cross section of an automotive alternator according to Embodiment 1 of the present invention. This alternator includes: a case 3 composed of an aluminum front bracket 1 and an aluminum rear bracket 2; a shaft 6 disposed within the case 3 having a pulley 4 secured to a first end thereof; a Lundell-type rotor 7 secured to the shaft 6; fans 5 secured to both end surfaces of the rotor 6; a stator 8A secured to an inner wall of the case 3; slip rings 9 secured to a second end of the shaft 6 for supplying electric current to the rotor 7; a pair of brushes 10 sliding on the slip rings 9; brush holders 11 accommodating the brushes 10; a rectifier 12 in electrical contact with the stator 8A for converting alternating current generated in the stator 8A into direct current; a heat sink 17 fitted over the brush holder 11; and a regulator 18 fastened to the heat sink 17 by adhesive for adjusting the magnitude of the alternating voltage generated in the stator 8A.

The rotor 7 is composed of a rotor coil 13 for generating magnetic flux on passage of electric current, and a pair of first and second pole cores 20 and 21 disposed so as to cover the rotor coil 13, magnetic poles being produced in the pair of pole cores 20 and 21 by the magnetic flux. The pair of pole cores 20 and 21 are made of iron and each has eight claw-shaped magnetic poles 22 and 23 secured to the shaft so as to be spaced at even pitch circumferentially around a circumferential edge, facing each other so as to intermesh.

The stator 8A includes a stator core 15 composed of a cylindrical laminated iron core in which a number of slots extending longitudinally are formed at a predetermined pitch in a circumferential direction, and a three-phase stator winding 116 wound into the stator core 15.

Air intake vents 1a and 2a are formed in central portions of the front bracket 1 and the rear bracket 2, respectively, and air discharge vents 1b and 2b are formed in outer circumferential shoulder portions of the front bracket 1 and the rear bracket 2, respectively.

Figure 2:
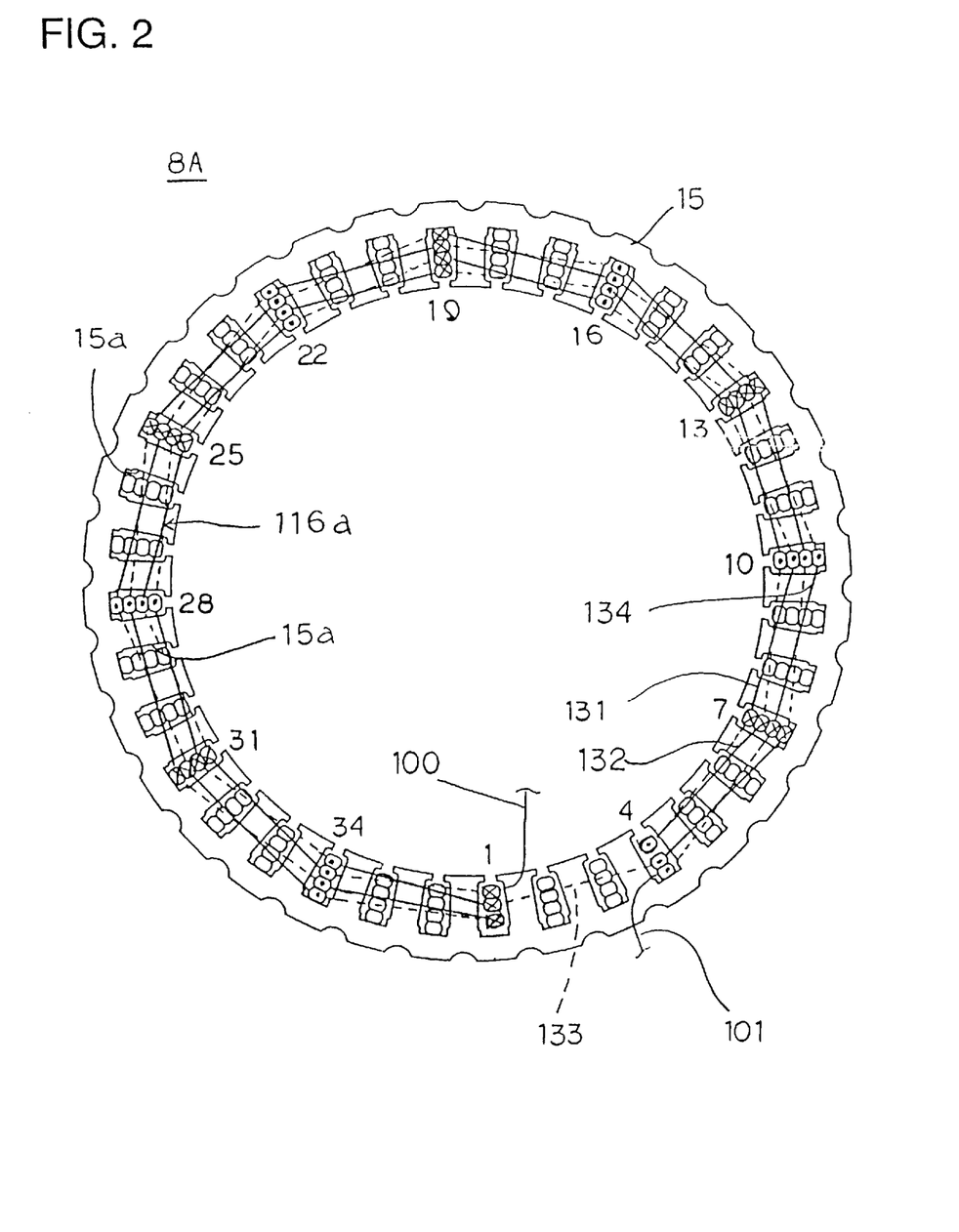
FIG. 2 is a wiring diagram for the stator in FIG. 1.

Next, the wiring construction of an a-phase stator winding portion 116a of the three-phase stator winding 116 will be explained with reference to the winding diagram in FIG. 2. Moreover, as in FIG. 5, this diagram shows the wiring construction when the stator 8A is viewed from the rear bracket 2 end, and the numbering and the meanings of the solid lines and dotted lines for the wires in the figure are the same as in FIG. 5.

The a-phase stator winding portion 116a includes first to fourth winding sub-portions 131 to 134. The first winding sub-portion 131, which has a first end connected to an a-phase lead wire 100, leads to the front bracket 1 end from the first position inside a slot 15a whose slot number is number 1. Thereafter, the first winding sub-portion 131 is constructed by wave winding such that the winding alternates between the second position and the first position within the slots every third slot in a clockwise direction, and arrives at the first position in slot number 4.

The second winding sub-portion 132, which has a first end directly and continuously connected to a second end of the first winding sub-portion 131 in slot number 4, leads to the rear bracket 2 end and then is constructed by wave winding such that the winding alternates between the second position and the first position within the slots every third slot in a counterclockwise direction, and arrives at the second position in slot number 1.

The third winding sub-portion 133, which has a first end directly and continuously connected to a second end of the second winding sub-portion 132 in slot number 1, leads to the front bracket 1 end and then is constructed by wave winding such that the winding alternates between the third position (but the second position in slot number 4) and the fourth position within the slots every third slot in a counterclockwise direction, and arrives at the third position in slot number 1.

The fourth winding sub-portion 134, which has a first end directly and continuously connected to a second end of the third winding sub-portion 133 in slot number 1, leads to the front bracket 1 end and then is constructed by wave winding such that the winding alternates between the fourth position and the third position within the slots every third slot in a clockwise direction, and arrives at the third position in slot number 4. A second end of the fourth winding sub-portion 134 is connected to a neutral point lead wire 101.

In this manner, in the a-phase stator winding portion 116a, the second end of the first winding sub-portion 131, whose first end is connected to the a-phase lead wire 100, is directly and continuously connected to the first end of the second winding sub-portion 132 in slot number 4, the second end of the second winding sub-portion 132 is directly and continuously connected to the first end of the third winding sub-portion 133 in slot number 1, and in addition the second end of the third winding sub-portion 133 is directly and continuously connected to the first end of the fourth winding sub-portion 133 in slot number 1, constituting a four-turn a-phase stator winding portion 116a.

Similarly, a b-phase stator winding portion and a c-phase stator winding portion are formed by offsetting by one slot 15a and, together with the a-phase stator winding portion, constitute the star-connected three-phase stator winding 116.

Moreover, the positional relationship between the lead wires of each of the phases and the neutral point lead wire are not shown, but these project circumferentially from the polyphase stator winding 116 at nonuniform pitch.

Next, the steps in manufacturing the above-mentioned a-phase stator winding portion 116a by joining a number of short conductor segments 50 similar to the one shown in FIG. 6 will be explained.

Figure 3:
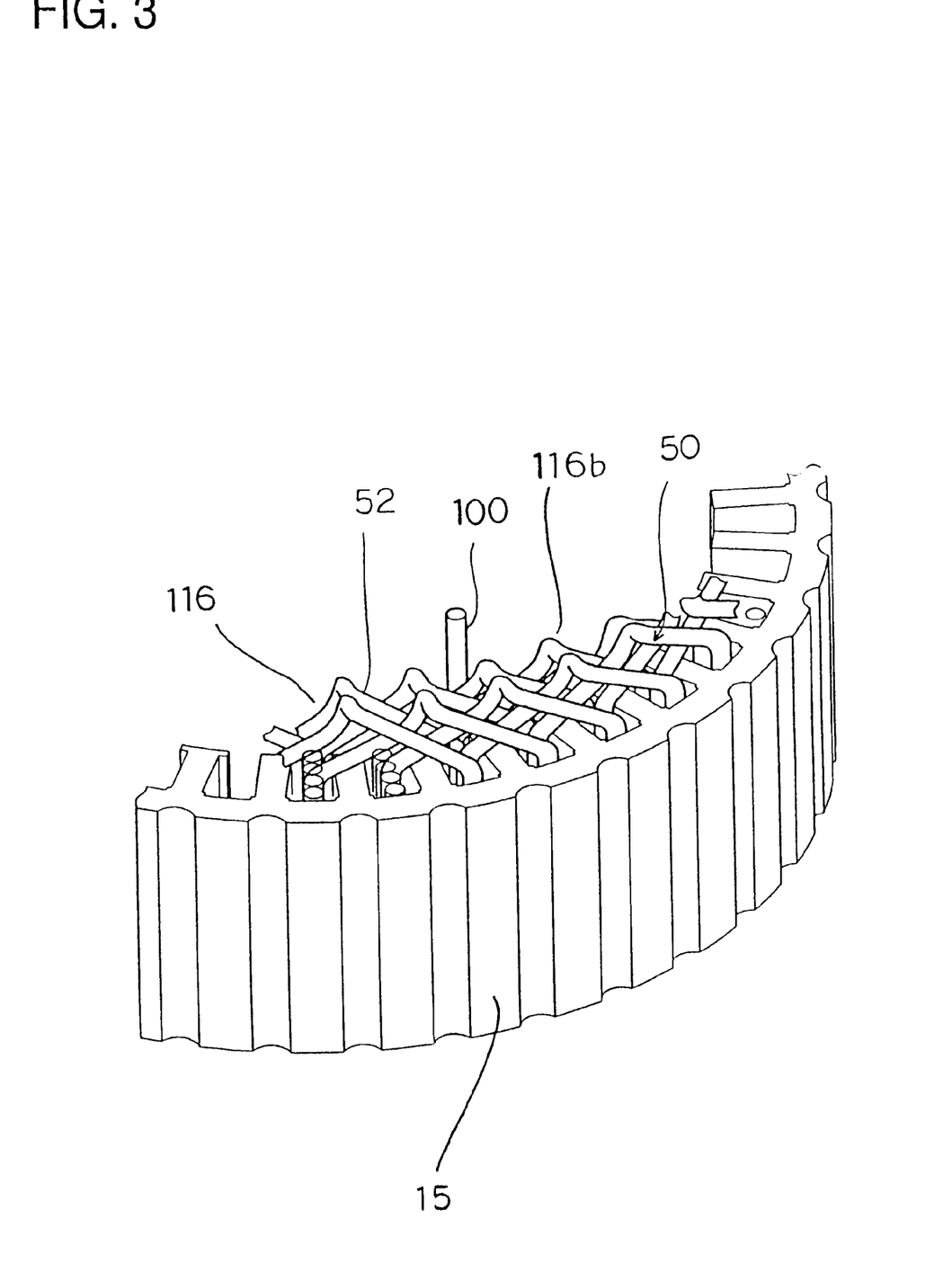
FIG. 3 is a partial perspective of the stator in FIG. 1 viewed from a rear bracket end.

First, by inserting conductor segments 50 from the rear bracket 2 end into a predetermined slot number such that the first straight portion 51a of a first conductor segment 50 is in the first position and the second straight portion 51b of the first conductor segment 50 is in the second position three slots away, and the first straight portion 51a of a second conductor segment 50 is in the third position and the second straight portion 51b of the second conductor segment 50 is in the fourth position three slots away, within each of the slots 15a, three straight portions 51a and 51b of conductor segments 50 are arranged to line up in a radial direction in slot number 1 and slot number 4, and four straight portions 51a and 51b of conductor segments 50 are arranged to line up in a radial direction in the remaining slot numbers 2, 3, and 5 to 34.

Then, at the front bracket 1 end, the joining portions 53*a* leading out from the straight portions 51*a* in the first position and the joining portions 53*b* leading out from the straight portions 51*b* in the second position three slots away are joined, and the joining portions 53*a* leading out from the straight portions 51*a* in the third position and the joining portions 53*b* leading out from the straight portions 51*b* in the fourth position three slots away are joined. Moreover, in FIG. 2, the base end portions 52 of the conductor segments 50 are indicated by the solid lines for the wires, and the adjacent joining portions 53*a* and 53*b* connected to each other are indicated by the dotted lines for the wires.

Moreover, the joining portion 53*b* leading to the front bracket 1 end from the third position of slot number 1 is joined to the joining portion 53*a* leading to the front bracket 1 end from the fourth position of slot number 34. Furthermore, Moreover, the joining portion 53*a* leading to the front bracket 1 end from the first position of slot number 4 is joined to the joining portion 53*b* leading to the front bracket 1 end from the first position of slot number 7.

In the automotive alternator of the above construction, the first winding sub-portion 131 to the fourth winding sub-portion 134 are directly and continuously connected within the slots 15*a*, eliminating the need for the bridging portions 60 to 62 required conventionally, removing the risk of shorting due to contact among the bridging portions 60 to 62. Furthermore, coil ends 80*b* of the stator winding 116 extending in an axial direction towards the rear bracket 2 are made compact. Moreover, the need for conductor segments 50 having different dimensions from other conductor segments 50 is eliminated, improving the operation of insertion into the slots 15*a*.

In the rear bracket 2 end, external air is drawn in by rotation of the fans 5 through the air intake vents 2*a* and flows along the axis of the shaft 6, cooling the rectifier 12 and the regulator 18, and is then deflected centrifugally by the fans 5, cooling the coil ends 80*b* of the three-phase stator winding 16 before being expelled through the air discharge vents 2*b* to the outside, but since the conventional bridging portions 60, 61, and 62 are no longer present, noise due to interference between the ventilation and the bridging portions 60, 61, and 62 does not arise.

Furthermore, because the coil ends 80*a* and 80*b* of the three-phase stator winding 116 are directly cooled by rotation of the fans 5, temperature increases in the three-phase stator winding 116 can be suppressed.

The lead wires of each of the phases and the neutral point lead wire project circumferentially from the polyphase stator winding 116 at nonuniform pitch, and by making them protrude in positions which dissipate certain orders of wind noise, and making them protrude in positions which do not hinder the path of ventilation, loud noise can be reduced.

Moreover, the above embodiment has been explained with reference to a three-phase, 12-pole, 36-slot automotive alternator, but naturally the present invention is not limited to these numbers, and a three-phase, 12-pole, 72-slot alternator or a three-phase, 16-pole, 96-slot alternator may also be used, and a six-phase or nine-phase alternator may also be used.

As explained above, an alternator according to one aspect of the present invention, the alternator comprises: a case; a rotor disposed inside the case, north-seeking and south-seeking poles being formed alternately around a rotational circumference of the rotor; and a stator having a stator core surrounding the rotor, and a polyphase stator winding installed in the stator core, a number of slots extending in an axial direction being formed in the stator core at a predetermined pitch in a circumferential direction, each phase of stator winding portion in the polyphase stator winding being formed in a number of turns by electrically connecting in series a number of winding sub-portions each constructed substantially in one lap such that wire forms coil ends which bend back outside the slots at end surfaces of the stator core, and alternates between inner layers and outer layers in a slot depth direction within the slots at intervals of a predetermined number of the slots, (n−1) turns of the wire being housed in a slot housing a first end portion of the stator winding portion connected to a lead wire and a slot housing a second end portion of the stator winding portion connected to a neutral point lead wire, and n turns of wire being housed in other slots, the winding sub-portions being directly and continuously connected to each other within the slots. Therefore, the bridging portions required conventionally are eliminated, removing the risk of shorting due to the bridging portions contacting each other. Furthermore, the coil ends of the stator winding extending in the axial direction are made compact. Moreover, the amount of extra copper which would have been used in the bridging portions can be eliminated, reducing copper loss.

According to one form of the alternator, the wire may be composed of a number of conductor segments each having: two straight portions, each being housed within a different slot among said slots; a U-shaped base end portion connecting the straight portions, the base end portion protruding from a first end portion of the stator core; and joining portions disposed on end portions of each of the straight portions, the joining portions protruding from a second end portion of the stator core, the winding sub-portions being constructed by connecting adjacent joining portions of the conductor segments to each other. Therefore, the need to form irregularly shaped conductor segments and house them in the slots is eliminated, and the need to prepare several types of conductor segment is also eliminated, further improving insertion of the conductor segments.

According to another form of the alternator, the straight portions may be arranged to line up in a row within each of said slots. Therefore, contact surface area between the straight portions and the inner walls of the slots is increased, promoting transfer of heat from the straight portions to the stator core, enabling temperature increases in the polyphase stator winding to be suppressed.

According to still another form of the alternator, the lead wires and the neutral point lead wires of each phase may project circumferentially from the polyphase stator winding at nonuniform pitch. Therefore, by making leads protrude in positions which dissipate certain orders of wind noise, and making leads protrude in positions which do not hinder the passage of ventilation, loud noise can be reduced.

According to one form of the alternator, a fan for directly conveying ventilation to the coil ends of the polyphase stator winding may be disposed on at least one end surface of the rotor. Therefore, temperature increases in the stator winding can be suppressed.

According to another form of the alternator, air discharge vents may be formed in the case for expelling ventilation conveyed to the coil ends to an exterior portion of the case. Therefore, the amount of ventilation increases, enabling temperature increases in the stator winding to be suppressed.

What is claimed is:

1. An alternator comprising:
   a case;
   a rotor disposed inside said case, north-seeking and south-seeking poles being formed alternately around a rotational circumference of said rotor; and a stator having a stator core surrounding said rotor, and a polyphase stator winding installed in said stator core, a number of slots extending in an axial direction being formed in said stator core at a predetermined pitch in a circumferential direction, each phase of stator winding portion in said polyphase stator winding being formed in a number of turns by electrically connecting in series a number of winding sub-portions each constructed substantially in one lap such that a wire forms coil ends which bend outside said slots at end surfaces of said stator core, and alternates between inner layers and outer layers in a slot depth direction within said slots at intervals of a predetermined number of said slots, (n−1) turns of said wire being housed in a slot housing a first end portion of said stator winding portion connected to a lead wire and a slot housing a second end portion of said stator winding portion connected to a neutral point lead wire, and n turns of wire being housed in other slots, said winding sub-portions being directly and continually connected to each other in series within said slots, wherein n is a whole number integer.

2. The alternator according to claim 1 wherein said wire is composed of a number of conductor segments each having:

two straight portions, each being housed within a different slot among said slots;

a U-shaped base end portion connecting said straight portions, said base end portion protruding from a first end portion of said stator core; and joining portions disposed on end portions of each of said straight portions, said joining portions protruding from a second end portion of said stator core, said winding sub-portions being constructed by connecting adjacent joining portions of said conductor segments to each other.

3. The alternator according to claim 2 wherein said straight portions are arranged to line up in a row within each of said slots.

4. The alternator according to claim 1 wherein said lead wires of each phrase and said neutral point leads wires project circumferentially from said polyphase stator winding at nonuniform pitch.

5. The alternator according to claim 1 wherein a fan for directly conveying ventilation to said coil ends of said polyphase stator winding is disposed on at least one end surface of said rotor.

6. The alternator according to claim 1 wherein air discharge vents are formed in case for expelling ventilation conveyed to said coil ends to an exterior portion of said case.

* * * * *